United States Patent
Mishima

(10) Patent No.: US 6,807,296 B2
(45) Date of Patent: Oct. 19, 2004

(54) COLOR CONVERSION METHOD AND APPARATUS FOR CHROMAKEY PROCESSING

(75) Inventor: Yasushi Mishima, Shinagawa-ku (JP)

(73) Assignee: IMAGICA Corp., Osaka (JP)

( * ) Notice: Subject to any disclaimer, the term of this patent is extended or adjusted under 35 U.S.C. 154(b) by 629 days.

(21) Appl. No.: 09/924,454

(22) Filed: Aug. 9, 2001

(65) Prior Publication Data

US 2002/0164071 A1 Nov. 7, 2002

(30) Foreign Application Priority Data

Mar. 14, 2001 (JP) ........................................ 2001-072469

(51) Int. Cl.[7] ................................................. G06K 9/00

(52) U.S. Cl. ........................ 382/162; 382/164; 382/165; 382/167; 382/282; 382/283; 382/284; 358/518; 358/523; 358/525; 358/540; 348/587; 348/591; 348/592; 348/590; 348/645

(58) Field of Search ................................. 382/162–167, 382/276, 282, 283, 284, 289, 291, 293, 294, 295, 296, 297, 300; 358/525, 537, 538, 540, 518, 519, 520, 521, 522, 523, 524; 348/584, 585, 587, 586, 588, 590, 591, 592, 593, 606, 607, 631, 645

(56) References Cited

U.S. PATENT DOCUMENTS

| | | | |
|---|---|---|---|
| 4,344,085 A | | 8/1982 | Vlahos |
| 4,408,221 A | * | 10/1983 | McCoy ........................ 348/587 |
| 4,533,937 A | | 8/1985 | Yamamoto et al. |
| 4,625,231 A | | 11/1986 | Vlahos |
| 5,087,965 A | | 2/1992 | Torre-Bueno |
| 5,089,882 A | | 2/1992 | Kaye et al. |
| 5,630,037 A | | 5/1997 | Schindler |
| 5,831,685 A | * | 11/1998 | Vlahos et al. ............... 348/587 |
| 5,903,318 A | | 5/1999 | Demay et al. |
| 6,011,595 A | | 1/2000 | Henderson et al. |
| 6,262,778 B1 | * | 7/2001 | Nonweiler et al. .......... 348/586 |
| 6,445,816 B1 | * | 9/2002 | Pettigrew .................... 382/162 |
| 2002/0025066 A1 | * | 2/2002 | Pettigrew .................... 382/162 |

OTHER PUBLICATIONS

Thomas Porter, et al., Computer Graphics, vol. 18, No. 3, pp. 253–259, "Compositing Digital Images", Jul. 1984.

Mikio Takagi, et al., Tokyo Daigaku Shuppan–kai, Gazo–Kaiseki, pp. 663–665, "Handbook for Image Analysis", Jan. 17, 1991 (with English translation).

* cited by examiner

*Primary Examiner*—Bhavesh M. Mehta
*Assistant Examiner*—Ali Bayat
(74) *Attorney, Agent, or Firm*—Oblon, Spivak, McClelland, Maier & Neustadt, P.C.

(57) ABSTRACT

Upon chromakey processing, 4×4 transformation matrix is provided through which a backing color selected is transformed to the original point and monochrome color is transformed to vertically distribute at a spot away from the original point along an axis. Matrix multiplication comprising only addition and multiplication is applied to a foreground image data signal to generate a masked output image and a color-processed foreground output image without requiring complex arithmetic operations.

3 Claims, 6 Drawing Sheets

COLOR-PROCESSED FOREGROUND OUTPUT IMAGE

MASKED OUTPUT IMAGE

COLOR CONVERSION METHOD AND APPARATUS FOR CHROMAKEY PROCESSING

BACKGROUND OF THE INVENTION

1. Field of the Invention

The present invention relates to color conversion method and apparatus for chromakey processing.

2. Description of the Related Art

A chromakey apparatus or image compositing apparatus which utilizes a color differential background (mainly in the form of blue or green screen) for broadcast and feature movie productions is often designed to process an image to be processed in a manner described below. Firstly, an object of shooting is located in front of a single colored screen as a background and is shot to produce an image material (hereinafter referred to as an "image to be processed"). Apart from this, an image material to be used as a background in composition is prepared. With these image materials being inputted to the apparatus, the following steps are carried out sequentially.

(1) One color (backing color) is selected for the background or to represent the background.

(2) Two classification boundaries are set in a color space such as an RGB or YIQ color space to divide the color space into three different regions of complete backing, complete foreground and transition regions. The complete backing region need to contain the backing color. The term "RGB" refers to a color system of three primary colors which have most in common with the visible characteristics of human beings. The term "YIQ" refers to a color system which is one of so-called color difference systems adapted for TV displays and transmittal of images; Y stands for a component representing brightness and I and Q are orthogonal coordinates for indicating positions on a color hue ring.

(3) Each of pixels constituting the image to be processed is checked as to its position in the color space.

(4) When the pixel is contained in the complete backing or complete foreground region, its contribution is defined to be 0% or 100%, respectively. If it is contained in the transition region, distances of the pixel to the two classification boundaries are checked to determine its contribution on the basis of its proximity or similarity to the complete regions; the contribution is greater than 0% and smaller than 100%.

(5) From each color component of the color to be processed, each color component of the backing color is subtracted and the subtractive result is multiplied by inverse of the contribution obtained in (4). Then, the backing color is added thereto to determine an essential color of the object of shooting.

(6) The product of the multiplication of the essential color and the contribution is added to the product of the multiplication of the composite background and the complement of the contribution, i.e., (100%-[contribution]).

The composite result can be obtained by the above steps. In step (2) above, an RGB space with three axes of the three primary colors of red, green and blue is popularly used in conventional apparatuses.

The conventionally used RGB space is, however, a color coordinate space adapted to characteristics of a camera or a display and has little causal relation to intrinsic processing structure of chromakey. A coordinate space should be employed which is suited for classifying colors and for checking distances in a color space. In other words, it is essential to use a coordinate space which contributes to easy handling such as checking of similarity of the pixels of the image to be processed to the backing color or to the color of the object of shooting in the foreground.

The present invention was made in view of the above and has its object to provide color conversion method and apparatus for chromakey processing which can produce a masked output image and a color-processed foreground output image without requiring complex arithmetic operations in order to produce a composite image with backing color components being suppressed.

BRIEF SUMMARY OF THE INVENTION

The present invention is directed to a color conversion method for chromakey processing wherein a foreground image taken with an object of shooting located in front of a single colored screen and a background image to be used in a completed composite image are composited, which comprises transforming an original coordinate system into a coordinate system wherein a backing vector is a principal axis and a backing color selected is at an original point, said backing vector being line drawn perpendicularly from the backing color to monochrome straight line, and comparing a distance between pixel data to be processed and the backing color, a distance defined by a base control variable selected and a distance defined by a mask control variable selected, generating transformation coefficients on the basis of a comparison result before pixel processing and using said transformation coefficients to perform processing on a pixel by pixel basis, thereby generating a mask signal.

Said color conversion method for chromakey processing may further comprise comparing the distance between pixel data to be processed and the backing color, the distance defined by the base control variable selected and a distance defined by a spill control variable selected, generating transformation coefficients on the basis of a comparison result before pixel processing and using said transformation coefficients to perform processing on a pixel by pixel basis, thereby suppressing any spill of backing color components existing in the foreground image and replacing the same with a replacement color selected.

The present invention is further directed to a color conversion apparatus for chromakey processing wherein a foreground image taken with an object of shooting located in front of a single colored screen and a background image to be used in a completed composite image are composited, which comprises a setup data input module for setup of a backing color, a replacement color, a base control variable, a mask control variable and a spill control variable, a setup data translation module for transforming an original coordinate system into a coordinate system wherein a backing vector is a principal axis and a backing color selected in said setup data input module is at an original point, said backing vector being line drawn perpendicularly from the backing color to monochrome straight line, for comparing a distance between pixel data to be processed and the backing color, a distance defined by the base control variable selected and a distance defined by the mask control variable selected, for comparing the distance between pixel data to be processed and the backing color, the distance defined by the base control variable selected and a distance defined the by the spill control variable selected and for generating transformation coefficients on the basis of comparison results before pixel processing and a pixel processing module for using said transformation coefficients generated in the setup data translation module to perform processing on a pixel by pixel basis, thereby generating a mask signal and suppressing any spill of the backing color components existing in the foreground image and replacing the same with a replacement color selected.

Color conversion method and apparatus according to the invention can provide the following advantages.

According to the invention, two concepts are adopted:

(1) conversion to arrange a group of colors contained in the object of shooting in the foreground to a color form close to a plane typically expressed by z=constant; and (2) conversion to enable a distance between any selected color and the backing color on the plane of z=constant to be dealt with a normalized numerical value. Thus, these conversions are adopted so that the colors of the object of shooting, which need to be treated equivalently in the composition process, can be concentrated in a single spot in a one-dimensional feature space along, for example, the z-axis. The z-component represents the similarity to the backing color. Moreover, the positional relationship between the color to be processed and the classification boundaries can be computed simply by comparing them with respect to size in terms of one of the components (z component) of the space coordinate. Furthermore, the proximity to the classification boundaries can be detected simply by checking the size of one of the components of the space coordinate.

As for internal processing, the invention provides the advantage that the multiplication of the inverse of the contribution (or the division using the contribution as a divisor) in step (5) and the multiplication in step (6) can be replaced by a multiplication and an addition by carrying out the operations in a normalized coordinate space. This processing using the color space can be utilized as a core to efficiently implement functional features of chromakey such as correction of an uneven backing, processing of a semi-transparent object of shooting and suppression of spill of the backing color to the object of shooting in the foreground.

Now, the invention will be described in greater detail with reference to the accompanying drawings.

DETAILED DESCRIPTION OF THE PREFERRED EMBODIMENT

Figure 1:
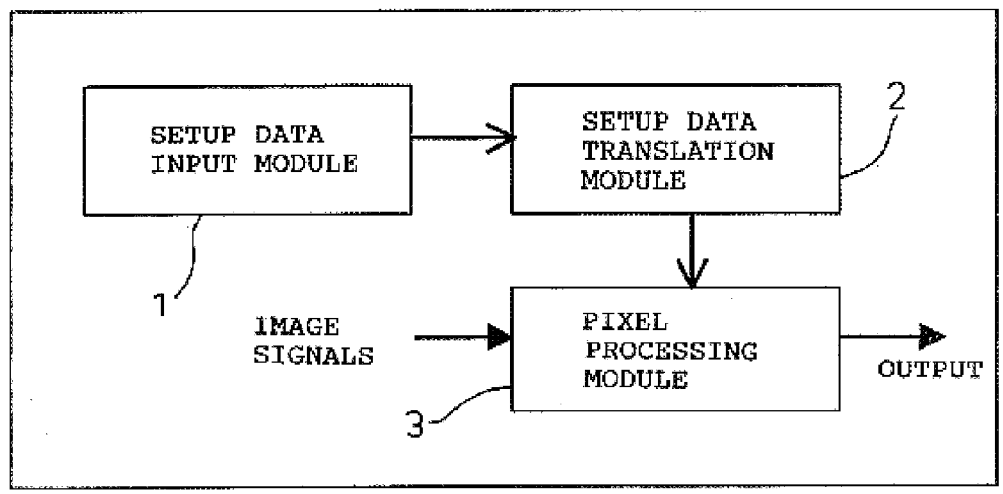
FIG. 1 is a schematic block diagram of an apparatus according to an embodiment of the invention.

Inputted to the apparatus are signals of images comprising (a) a "foreground image" which is an image material taken with an object of shooting being located in front of a single colored screen and (b) a "composite background image" which is an image material to be used as a background in a completed composite image. The signals to be processed by the apparatus are RGB digital video signals and each pixel of the images needs to hold data. As shown in FIG. 1, the chromakey apparatus according to the invention comprises three modules, i.e., (1) a setup data input module 1, (2) a setup data translation module 2 and (3) a pixel processing module 3.

Now, each of the modules will be described in detail.

The setup data input module 1 performs the following process.

This module deals with a user's inputting of setup data to the apparatus. The system according to the invention uses five kinds of setup data:

(1) A backing color 6 (see FIG. 3) which is typical.

(2) A replacement color which is selected to suppress backing color 6 components in the object of shooting in the foreground.

(3) A base control variable which indicates a tolerable level of the color feature regarded completely as backing and which represents the location of a boundary between a complete background region and a transition region.

(4) A mask control variable which is an intensity parameter for determining a mask density in terms of similarity to the backing color 6 and which represents the location of a boundary between the transition region and a complete foreground region.

(5) A spill control variable which is an intensity parameter to be used for suppressing any spill of the backing color 6 existing in the object of shooting in the foreground and replacing it with the replacement color.

Figure 2:
FIG. 2 is a schematic illustration of selecting a backing color 6 on an image plane.

Of these setup data, the backing color 6 is taken into the processing apparatus by a user who moves an on-screen square cursor 4 on an image plane displaying a foreground image, as shown in FIG. 2, onto a backing screen 5, and depresses a decision button. The data is expressed as $B=X_b, Y_b, Z_b$.

The replacement color is taken into the processing apparatus, using three volume control knobs for setting values for the respective color components. The data is expressed as $R=X_r, Y_r, Z_r$.

Each of the base, mask and spill control variables is taken into the processing apparatus by the user who inputs the intensity thereof by means of a corresponding volume control knob. The data are expressed as $I_b, I_m, I_s$, respectively.

The setup data translation module 2 performs the following process.

In order that the data inputted to the setup data input module 1 may be used for pixel processing, preparation is made for processing the data to efficiently compute the pixel data. This preparation is referred to as "translation".

Figure 3:
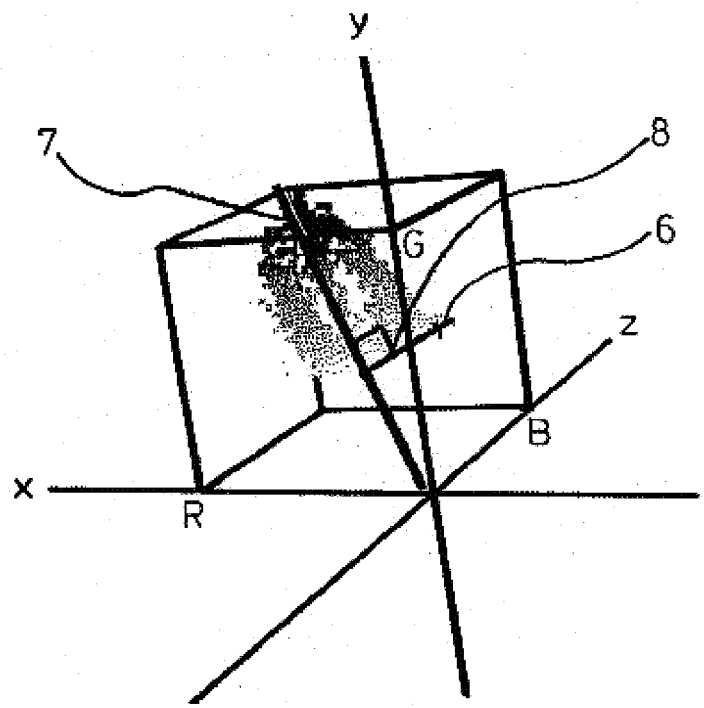
FIG. 3 is an illustration of locations of a monochrome line 7 and a backing vector 8 in a color space.

For easy separation, upon pixel processing, of the region of the backing color 6 from that of the object of shooting in the foreground, mapping is basically carried out to express characterizing masses of the regions by means of single variables, respectively. In this connection, a "monochrome color" is used as a typical color sample of the object of shooting. That is, a monochrome color ranging from black to white with gradations of gray in between may possibly be the foreground against any colored backing so that it is generally taken for a foreground color. The monochrome color is expressed in a color space by a straight line regardless of whether the color space is that of YIQ or of RGB. The straight line is referred to as a "monochrome straight line" 7. Referring to FIG. 3, line drawn perpendicularly from the backing color 6 inputted to the setup data input module 1 to the monochrome straight line 7 is referred to as a "backing vector" 8. The pixel data in the color space changes along the backing vector 8 from a color similar to the backing color 6 to the color similar to that of the foreground. Thus, the similarity of the color data to be processed to the backing color 6 can be readily determined by transforming the coordinate system to one where the backing vector 8 is a principal axis and then performing the process in this system.

Now, the process of the coordinate system transformation using the data inputted to the setup data input module 1 and specific transformation formulae which are used for the embodiment will be described in detail below.

Assume here that the original coordinate system is RGB and the coordinate system obtained as a result of the transformation is xyz. Since the transformation is realized by synthetically combining a number of transformations, all intermediate coordinate systems will be numerically suffixed.

Figure 4:
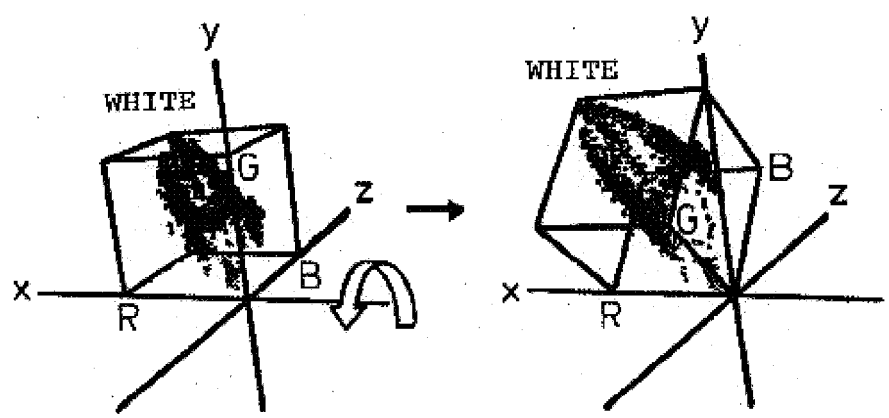
FIG. 4 is an illustration of rotating the monochrome line 7 onto the xy plane.
Figure 5:
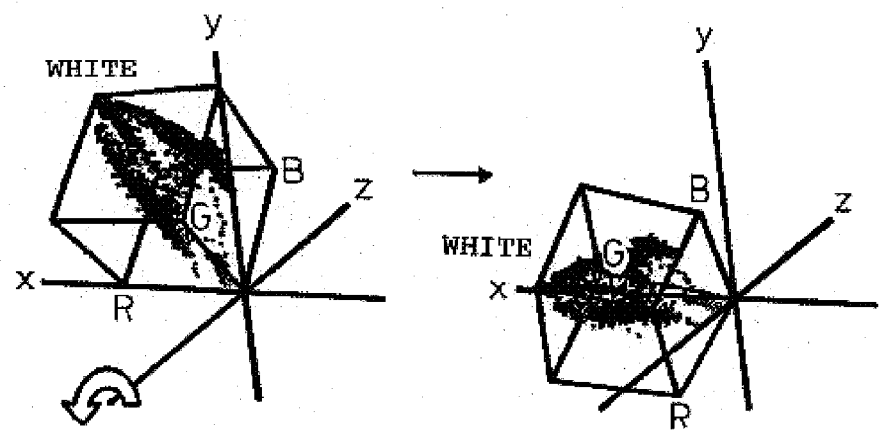
FIG. 5 is an illustration of rotating the monochrome line 7 onto the x-axis.

First, the monochrome straight line 7 is rotated around the x-axis until it is located on the xy plane as shown in FIG. 4. The straight line which is a result of the monochrome straight line 7 projected onto the xz plane is out of alignment from the x-axis by an angle of 45°, which is expressed by the matrix below.

$$P_1 = M_1 P \qquad \text{formulae (1)}$$

$$M_1 = \begin{pmatrix} 1 & 0 & 0 & 0 \\ 0 & w & w & 0 \\ 0 & -w & w & 0 \\ 0 & 0 & 0 & 1 \end{pmatrix}$$

$$w = \frac{1}{\sqrt{2}}$$

where P is the original data to be processed and $P_n$ is the data to be processed as obtained by the transformation using matrix transformation $M_n$. Then, the monochrome straight line 7 on the xy plane is rotated around the z-axis until it is located on the x-axis as shown in FIG. 5. The monochrome straight line 7 rotated by $M_1$ is out of alignment from the x-axis by an angle θ which is expressed by formula (2):

$$\theta = \arcsin\left(\frac{\sqrt{2}}{\sqrt{3}}\right) \qquad \text{formula (2)}$$

A rotational transformation as expressed by formulae (3) below is used for a turn of the angle θ.

$$P_2 = M_2 P_1 \qquad \text{formulae (3)}$$

$$M_2 = \begin{pmatrix} v & v_0 & 0 & 0 \\ -v_0 & v & 0 & 0 \\ 0 & 0 & 1 & 0 \\ 0 & 0 & 0 & 1 \end{pmatrix}$$

$$v = \cos\theta = \frac{1}{\sqrt{3}}, v_0 = \sin\theta = \frac{\sqrt{2}}{\sqrt{3}}$$

After the above two rotational transformations, a transformation of laying the backing vector 8 onto the z-axis is carried out while the monochrome straight line 7 is held on the x-axis. With the above coordinate transformations, $B = X_b, Y_b, Z_b$ of the backing color 6 in the RGB coordinate system is shifted to $B_2$.

$$B_2 = M_2 M_1 B \qquad \text{formula (4)}$$

Figure 6:
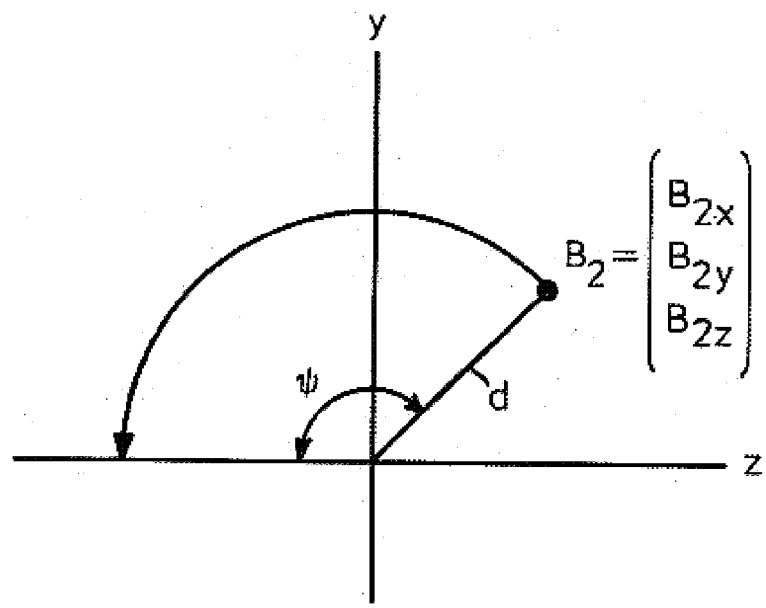
FIG. 6 is an illustration of an angle by which the backing color 6 is rotated onto the xz plane.

Then, $B_2$ is rotated around the x-axis and moved to an area of z<0 on the xz plane. Distance d between the projected point of $B_2$ on the yz plane and the original point is expressed by formula 5 below, providing that the coordinate components of $B_2$ are $B_{2x}$, $B_{2y}$ and $B_{2z}$, (see FIG. 6).

$$d = \sqrt{B_{2y}^2 + B_{2z}^2} \qquad \text{formula (5)}$$

The cosine and sine of an angle ψ between the projected point of $B_2$ on the yz plane and the negative direction of the z-axis are expressed by formulae (6) below.

$$\cos\psi = \frac{B_{2y}}{d} \qquad \text{formulae (6)}$$

$$\sin\psi = \frac{-B_{2z}}{d}$$

Therefore, the matrix representing the rotational transformation is expressed by formulae (7) below.

$$M_3 = \begin{pmatrix} 1 & 0 & 0 & 0 \\ 0 & W & -V & 0 \\ 0 & V & W & 0 \\ 0 & 0 & 0 & 1 \end{pmatrix} \qquad \text{formulae (7)}$$

$$W = \cos\psi$$
$$V = \sin\psi$$

With the above transformations, the backing color 6 is shifted to $B_3$ which is expressed by formula (8) below.

$$B_3 = M_3 B_2 \qquad \text{formula (8)}$$

Figure 7:
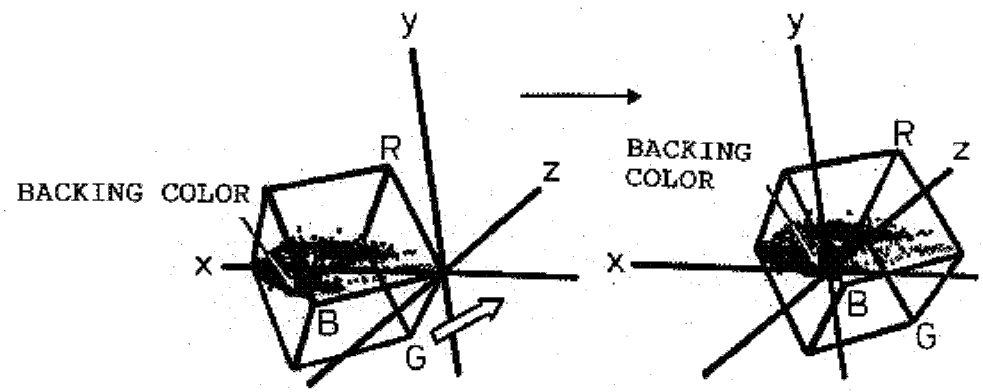
FIG. 7 is an illustration of translating the backing color 6 to the original point.

This can be translated to the original point of the xyz coordinate system by a matrix transformation using formula (9) below (see FIG. 7).

$$M_4 = \begin{pmatrix} 1 & 0 & 0 & -B_{2x} \\ 0 & 1 & 0 & 0 \\ 0 & 0 & 1 & 1 \\ 0 & 0 & 0 & 1 \end{pmatrix} \qquad \text{formula (9)}$$

Now, $P_2$ can be transformed as formula (10) below, using $M_3$ and $M_4$.

$$P_4 = M_4 M_3 P_2 \qquad \text{formula (10)}$$

With the above transformations, the monochrome straight line 7 is shifted to be expressed by formulae (11) below.

$$\begin{cases} x = t \\ y = 0 \\ z = -B_{3z} \end{cases} \quad \text{formulae (11)}$$

The coordinate system obtained as a result of the above transformations shows the following two characteristics: when the pixel data to be processed is converted into this coordinate system, (1) the pixel is close to the backing color 6 as the z component is close to 0 and
(2) the pixel is close to the monochrome color as the z component is close to $-B_{3z}$.

Thus, the similarity of the pixel to be processed to the backing color 6 can be determined simply by checking the z component.

Finally, the coordinate system is transformed into a normalized coordinate system, using the base, mask and spill control variables.

The base control variable is used to give a tolerable level to the color selected as the backing color 6. The mask control variable defines the distance between the backing color 6 and the color of the complete foreground region. The spill control variable defines the distance between the backing color 6 and the color of the spill regions (i.e., the region in the foreground which is affected by the backing color 6).

Assume that the distance between the pixel data being processed and the backing color 6 data is l. Then, the distance defined by the base control variable is $l_b$, the distance defined by the mask control variable is $l_m$ and the distance defined by the spill control variable is $l_s$.

If l is smaller than $l_b$, the data is regarded as that of the complete background region. If l is greater than $l_m$, the data is regarded as that of the complete foreground. If l is greater than $l_b$ and smaller than $l_m$, outputted is a mask signal showing an intermediary value between 0% and 100% and depending upon whether and how l is close to $l_b$ or $l_m$. Formula (12) used to compute a mask signal a in the transition region is:

$$a = \frac{l - l_b}{l_m - l_b} \quad \text{formula (12)}$$

As to spill control, the following process is used. If l is smaller than $l_b$, the data is not processed at all since it is of the complete background. If l is greater than $l_s$, it is assumed to have no influence by the backing color 6; then, the data of the original foreground image is outputted. If l is greater than $l_b$ and smaller than $l_s$, the degree of influence of the backing color 6 varies depending on whether and how l is close to $l_b$ or $l_s$; in this region, the spill intensity parameter s determined by formula 13 below is used to process the foreground data on a pixel by pixel basis.

$$s = \frac{l_s - l}{l_s - l_b} \quad \text{formula 13}$$

The coordinate system transformation is made to incorporate normalization of the coordinate system including this process so as to prevent the above two divisions from being performed on a pixel by pixel basis. First, a point separated by $l_b$ in the direction of the z-axis from the backing color 6 (that has been moved to the original point by the transformations conducted so far) is moved to the original point.

$$P_5 = M_5 P_4 \quad \text{formulae (14)}$$

$$M_5 = \begin{pmatrix} 1 & 0 & 0 & 0 \\ 0 & 1 & 0 & 0 \\ 0 & 0 & 1 & -l_b \\ 0 & 0 & 0 & 1 \end{pmatrix}$$

Then, a scale transformation is performed to make $l_m$ equal to 1.0, while maintaining the original point in the current position.

$$P_6 = M_6 P_5 \quad \text{formulae (15)}$$

$$M_6 = \begin{pmatrix} 1 & 0 & 0 & 0 \\ 0 & 1 & 0 & 0 \\ 0 & 0 & \frac{1}{l_m - l_b} & 0 \\ 0 & 0 & 0 & 1 \end{pmatrix}$$

In the coordinate system $P_6$ obtained by the transformations $M_5$ and $M_6$ above, the value of a agrees with z within the range of 0<z<1. Additionally, a=0 when z≦0; and a=1 when z≧1. When the monochrome color and the data which is far from the backing color 6 are used for the foreground, $l_m$ agrees with $-B_{3z}$.

Meanwhile, a scale transformation for making $l_s$ equal to 1.0 is independently performed after the transformation using $M_5$, while maintaining the original point in the current position:

$$P_7 = M_7 P_5 \quad \text{formulae (16)}$$

$$M_7 = \begin{pmatrix} 1 & 0 & 0 & 0 \\ 0 & 1 & 0 & 0 \\ 0 & 0 & \frac{1}{l_b - l_s} & 0 \\ 0 & 0 & 0 & 1 \end{pmatrix}$$

In the coordinate system $P_7$ obtained by the transformations $M_5$ and $M_7$ above, the value of s is expressed by s=1-z where z is in the range of 0<z<1. Additionally, s=1 when z≦0; and s=0 when z≧1.

It is the role of the setup data translation module 2 to compute the transformation M which is a composite transformation using $M_1$ through $M_6$ and the transformation N which is a composite transformation using $M_1$ through $M_5$ and $M_7$:

$$M = M_6 M_5 M_4 M_3 M_2 M_1$$

$$N = M_7 M_5 M_4 M_3 M_2 M_1 \quad \text{formulae (17)}$$

Of each of the composite matrixes, only the part corresponding to the z component of the third row is used for the processing. If the input data is r, g and b, required computations are expressed by formulae 18 below.

$$a = (-2vwV \cdot r + (vwV - wW) \cdot g + (vwV + wW) \cdot \quad \text{formulae (18)}$$

$$b + d) \cdot \frac{1}{l_m - l_b} + \frac{-l_b}{l_m - l_b}$$

-continued
$$s = (-2vwV \cdot r + (vwV - wW) \cdot g + (vwV + wW) \cdot$$
$$b + d) \cdot \frac{1}{l_b - l_s} + \frac{-l_b}{l_b - l_s}$$

The pixel processing module 3 is adapted to perform the following process.

The input data is processed on a pixel by pixel basis by using the transformation coefficients generated by the setup data transformation module 2. The input color data of the foreground image is transformed by means of the transformation coefficients and the z component of the data coordinate obtained is checked. Then, the original color data is processed for color by using the value obtained. If the result obtained from the input data P by the transformation M is Q and the result obtained from the input data P by the transformation N is K, their z coordinates a and s are required.

Q=MP a=$Q_z$

K=NP s=$K_z$      formulae (19)

First, the value A of the mask signal to be outputted is obtained by clamping a within the range between 0 and 1.

$$A = \begin{cases} 0 & (a < 0) \\ a & (0 \leq a \leq 1) \\ 1 & (a > 1) \end{cases} \quad \text{formula (20)}$$

Then, the following computations are used for the foreground which has been processed for color. Assume that the result obtained by clamping s within the range between 0 and 1 is S. S shows the extent of influence of the backing color 6 on the color of the object. The pixel color is changed as a function of the extent. If the influence of the backing color 6 is 100%, the color of the object is replaced by the replacement color. If the influence of the backing color is 0%, the color of the object is outputted without modification. If the influence is somewhere in between, the color of the object is brought closer to the replacement color as a function of the percentage. The result obtained as a result of the above processing is referred to as "processed foreground" U, which is derived from formulae (21) below.

U=(R−B)×S+P $X_u$=($X_r$−$X_b$)·S+$X_p$ $Y_u$=($Y_r$−$Y_b$)·S+$Y_p$ $Z_u$=($Z_r$−$Z_b$)·S+$Z_p$      formulae (21)

With A and U being obtained as a result of the above process, the foreground image is combined with the background image for composition, using a general linear key composite means. If the background image for composition is G($X_g$, $Y_g$, $Z_g$) and the end result is V($X_v$, $Y_v$, $Z_v$), the end result is obtained by formulae 22 below.

$X_v$=$X_u$·A+$X_g$·(1−A)

$Y_v$=$Y_u$·A+$Y_g$·(1−A)

$Z_v$=$Z_u$·A+$Z_g$·(1−A)      formulae (22)

There may be provided a wide variety of apparatuses which can be used for carrying out the method of the invention; a typical one will be described below.

Figure 8:
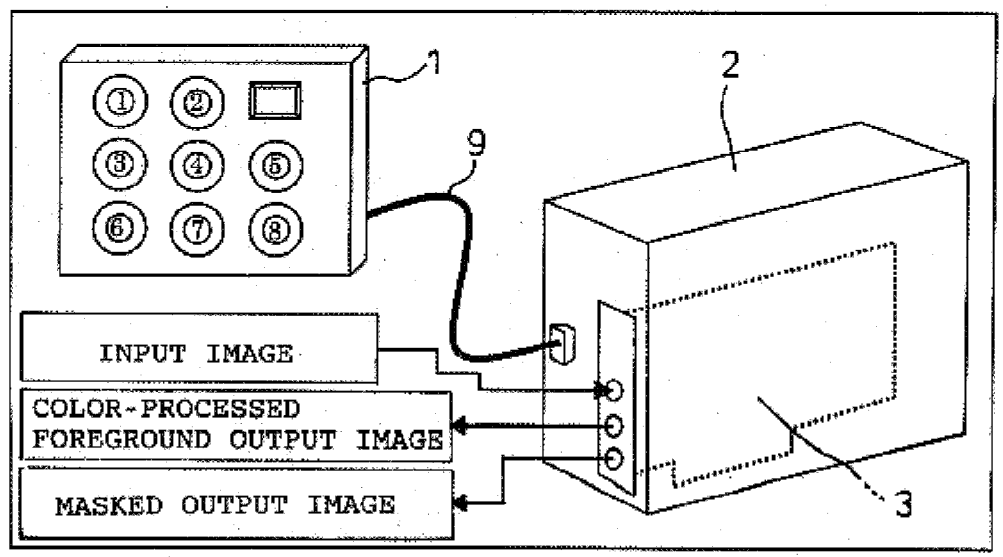
FIG. 8 is a perspective illustration of an apparatus according to the embodiment of the invention.

Referring to FIG. 8, the apparatus comprises three modules, i.e., a setup data input module 1, a setup data translation module 2 and a pixel processing module 3. The translation module 2 is in the form of a personal computer that performs computations for the purpose of setup data translation and, at the same time, carries out other operations such as taking in data from the setup data input module 1 and transferring the outcome of translation to the registers of the pixel processing module 3. The input module 1 is connected with the translation module 2 through an RS232C serial cable 9 whereas the processing module 3 is connected with the translation module 2 through a PCI interface.

The setup data input module 1 operates in a manner as described below. The user inputs the parameters of (1) backing color 6, (2) replacement color, (3) base control variable, (4) mask control variable and (5) spill control variable.

As shown in FIG. 8, the input module 1 has eight volume control knobs and a push button.

The volume control knobs #1 and #2 are used to control the location of the cursor 4 shown on the picture plane (see FIG. 2). As the button is depressed, the pixel data (RGB) of the spot where the cursor 4 is located is taken in from the frame buffer arranged in the pixel processing module 3 and transferred to the personal computer of the setup data translation module 2 so that it is used as a backing color 6 parameter.

The volume control knobs #3, #4 and #5 are used for inputting the replacement color. The knobs #3, #4 and #5 correspond to the R, G and B components, respectively. The inputted data is transferred to the personal computer of the setup data translation module 2 through the RS232C serial cable 9.

The volume control knob #6 is used to input the base control variable which is transferred to the personal computer of the setup data translation module 2 through the RS232C serial cable 9.

The volume control knob #7 is used to input the mask control variable which is transferred to the personal computer of the setup data translation module 2 through the RS232C serial cable 9.

The volume control knob #8 is used to input the spill control variable which is transferred to the personal computer of the setup data translation module 2 through the RS232C serial cable 9.

The setup data translation module 2 operates in a manner as described below.

This module 2 translates the parameters inputted by means of the setup data input module 1 and transfers the obtained results to the registers of the pixel processing module 3. Since composite elements are utilized in the pixel processing module 3, coefficients listed in formulae (23) below, which have been already shown in formula (18), are computed and stored, separately.

$K_0 = -2vwV \cdot r$      formulae (23)

$K_1 = vwV - wW$ $K_2 = vwV + wW$ $K_3 = d$

-continued $$K_4 = \frac{1}{l_m - l_b}$$

$$K_5 = \frac{-l_b}{l_m - l_b}$$

$$K_6 = \frac{1}{l_b - l_s}$$

$$K_7 = \frac{-l_b}{l_b - l_s}$$

$$K_8 = X_r$$

$$K_9 = Y_r$$

$$K_{10} = Z_r$$

The total of eleven computed outcomes are expressed in a fixed point format and transferred to the respective coefficient registers in the pixel processing module 3.

The pixel processing module 3 operates in a manner as described below.

Figure 9:
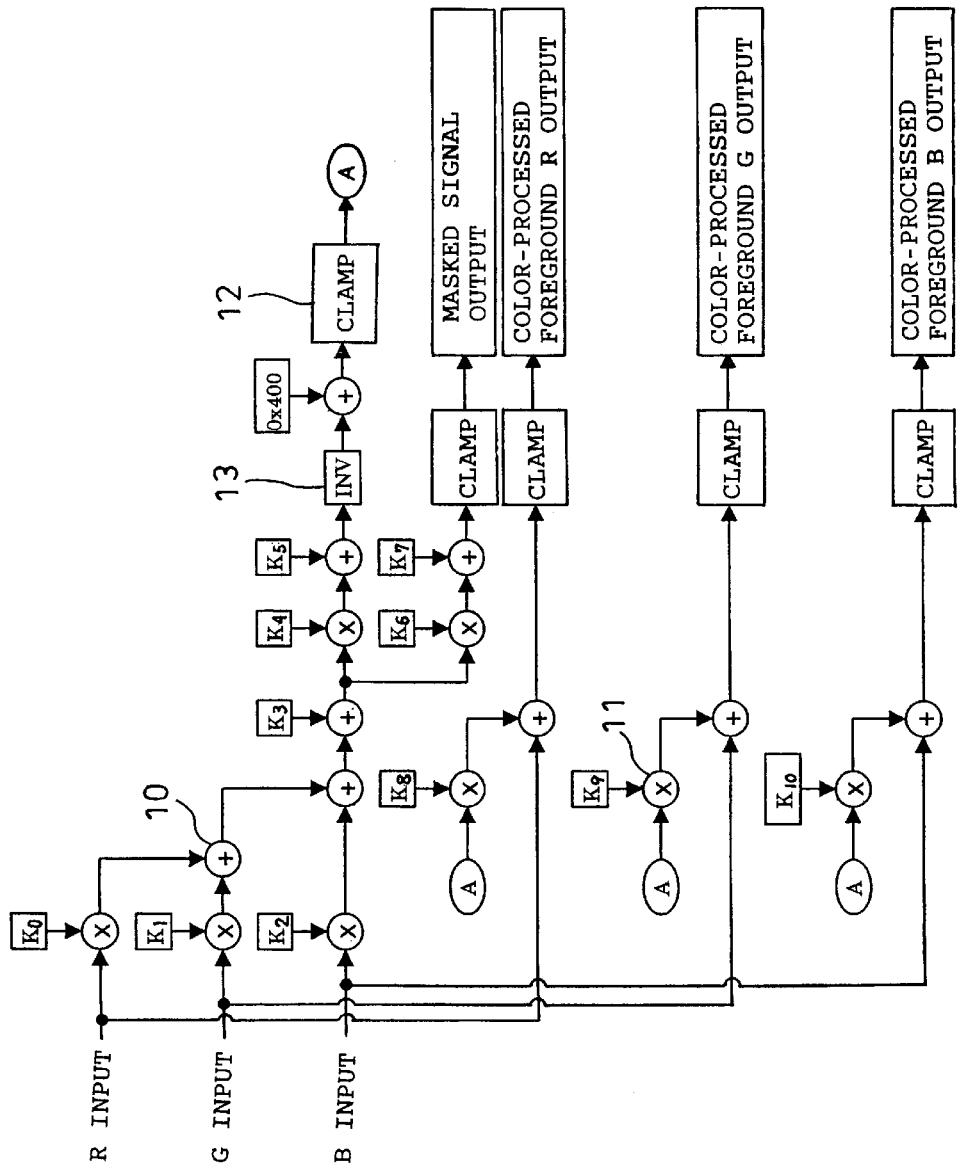
FIG. 9 is a block diagram showing a process of a pixel processing module 3 of the embodiment of the invention.

Referring to FIG. 9, the pixel processing module 3 comprises an adder 10, a multiplier 11, a clamping circuit 12 and an inverter 13. Each of the components of the inputted RGB digital signal is multiplied by coefficients $K_0$, $K_1$ and $K_2$ and added to each other along with $K_3$. Then, the outcome is multiplied by a coefficient $K_6$, and $K_7$ is added thereto. Thereafter, the outcome is clamped within the range between 0 and 1 to output the mask signal. Similarly, each of the components of the input RGB digital signal is multiplied by coefficients $K_0$, $K_1$ and $K_2$ and added to each other along with $K_3$. Then, the outcome is multiplied by a coefficient $K_4$, and $K_5$ is added thereto. Thereafter, the outcome is inverted and a constant 0x400 is added thereto before it is made to pass through the clamping circuit 12 to obtain a result A. Then, A is multiplied by a coefficient $K_8$, and R of the input signal is added thereto. The sum is clamped to produce an R output. Similarly, A is multiplied by a coefficient $K_9$, and G of the input signal is added thereto. The sum is clamped to produce a G output. Finally, A is multiplied by a coefficient $K_{10}$, and B of the input signal is added thereto. The sum is clamped to produce a B output. The constant 0x400 is a hexadecimal representation of the internal representation 1.0.

Figure 10:
FIG. 10 schematically shows a color-processed foreground output image and a masked output image of the embodiment of the invention.
Figure 10:

FIG. 10 shows a masked output image and a color-processed foreground output image which may be outputted from the pixel processing module 3.

Thus, according to the invention, for chromakey processing, the masked output image and the color-processed foreground output image can be generated without complex arithmetic operations when preparing the composite image with the backing color components being suppressed.

It is to be understood that the color conversion method and apparatus for chromakey processing according to the invention are not limited to the illustrated embodiment and that various changes and modifications may be made without departing from the scope and spirit of the invention.

Thus, the color conversion method and apparatus for chromakey processing according to the invention provide a remarkable advantage that, for chromakey processing, the masked output image and the color-processed foreground output image can be generated without complex arithmetic operations when preparing the composite image with the backing color components being suppressed.

What is claimed is:

1. A color conversion method for chromakey processing wherein a foreground image taken with an object of shooting located in front of a single colored screen and a background image to be used in a completed composite image are composited, which comprises transforming an original coordinate system into a coordinate system wherein a backing vector is a principal axis and a backing color selected is at an original point, said backing vector being line drawn perpendicularly from the backing color to monochrome straight line, and comparing a distance between pixel data to be processed and the backing color, a distance defined by a base control variable selected and a distance defined by a mask control variable selected, generating transformation coefficients on the basis of a comparison result before pixel processing and using said transformation coefficients to perform processing on a pixel by pixel basis, thereby generating a mask signal.

2. A color conversion method according to claim 1 further comprising comparing the distance between pixel data to be processed and the backing color, the distance defined by the base control variable selected and a distance defined by a spill control variable selected, generating transformation coefficients on the basis of a comparison result before pixel processing and using said transformation coefficients to perform processing on a pixel by pixel basis, thereby suppressing any spill of backing color components existing in the foreground image and replacing the same with a replacement color selected.

3. A color conversion apparatus for chromakey processing wherein a foreground image taken with an object of shooting located in front of a single colored screen and a background image to be used in a completed composite image are composited, which comprises a setup data input module for setup of a backing color, a replacement color, a base control variable, a mask control variable and a spill control variable, a setup data translation module for transforming an original coordinate system into a coordinate system wherein a backing vector is a principal axis and a backing color selected in said setup data input module is at an original point, said backing vector being line drawn perpendicularly from the backing color to monochrome straight line, for comparing a distance between pixel data to be processed and the backing color, a distance defined by the base control variable selected and a distance defined by the mask control variable selected, for comparing the distance between pixel data to be processed and the backing color, the distance defined by the base control variable selected and a distance defined the by the spill control variable selected and for generating transformation coefficients on the basis of comparison results before pixel processing and a pixel processing module for using said transformation coefficients generated in the setup data translation module to perform processing on a pixel by pixel basis, thereby generating a mask signal and suppressing any spill of the backing color components existing in the foreground image and replacing the same with a replacement color selected.

* * * * *